United States Patent Office 3,437,476
Patented Apr. 8, 1969

3,437,476
PROCESS FOR PURIFYING MERCURY
Ronald L. Dotson and Billy H. Simmons, Baton Rouge, La., assignors to The Dow Chemical Company, Midland, Mich., a corporation of Delaware
No Drawing. Filed Aug. 26, 1965, Ser. No. 482,927
Int. Cl. C22b 43/00
U.S. Cl. 75—103      11 Claims

ABSTRACT OF THE DISCLOSURE

A method for purifying mercury contaminated with metal and/or metal compounds which comprises contacting said contaminated mercury with an aqueous reaction solution containing a water soluble nitrogen containing compound selected from the group consisting of ammonium hydroxide, hydroxylamines, organic amines and mixtures thereof, with agitation, for a sufficient period of time to remove said impurities from the mercury and separating a purified mercury product from the aqueous reaction solution.

---

This invention relates to a method for purifying mercury contaminated with metals or metal compounds, and more particularly pertains to a method for purifying contaminated mercury, containing as contaminants, metals or compounds of iron, nickel, zinc, cooper, cobalt, molybdenum, lead or amphoteric metal compounds, by treating the mercury with aqueous ammonia, a water-soluble amine or a hydroxylamine, with or without salts of ammonia, amines or hydroxylamines.

In the operation of mercury cathode electrolytic cells, the mercury becomes contaminated with metals, metal salts or amalgams. These impurities must be removed to maintain cell efficiency, and the purification of the mercury must be effected with a minimum loss through water-soluble mercury salt formation or through formation of amalgams which are partially soluble in aqueous systems.

Prior processes for cleaning contaminated mercury include the following:

(1) A triple distillation, which requires extreme care to prevent escape of mercury vapors, and excessive costs in time and labor;

(2) Washing with a cyanide and a strong acid, which has the obvious disadvantage of possible escape of toxic HCN fumes;

(3) A three-step process of washing with a detergent several times, then with water, adding aqueous $Ca(OH)_2$ and allowing the mercury to stand for 48 hours, again washing with water, covering the mercury with dilute acetic acid for four days and occasionally stirring, and giving the mercury a final water wash; and, (4) Agitating a refractory, thick mercury contaminated with iron, copper or calcium, with an aqueous mixture of an ammonium salt of a strong acid and a strong acid for eight or more hours.

Thus, there is a need for a simple, effective process for purifying mercury contaminated with metals, metal salts or amalgams, and there is especially a need for a continuous process for purifying contaminated mercury wherein only trace amounts of mercury are dissolved in the purifying medium.

We have found that the contaminated mercury can be purified by agitating such mercury with an aqueous ammonium hydroxide, hydroxylamine or a water-soluble organic amine, with or without a salt of the enumerated nitrogen compounds, for a period of 5 to 90 minutes. Moreover, the proces can be made continuous by controlling the feed and withdrawal of the contaminated mercury and the feed and withdrawal of the ammonium hydroxide, organic amine or hydroxylamine solution.

Preferably, the treated mercury is washed with water after treatment with the alkaline nitrogen compound, prior to returning the purified mercury to the electrolytic cell or to storage. The amount of ammonium hydroxide, organic amine or hydroxylamine in solution in water is not critical, but it is best for rapid results to use a concentration of from about 10% to a saturated ammonium hydroxide or organic amine. Because of the limited solubility of hydroxylamine in water, it is desirable to add a salt of hydroxylamine to provide a concentration that is sufficiently high to be effective in a reasonable time for removal of contaminants. The preferred nitrogen containing compound is ammonium hydroxide in a concentration of 20–30%.

The time used can vary on the average of from about 5 to about 90 minutes, but the most desirable time is an average of from about 15 to about 45 minutes (depending on the degree of contamination of the mercury).

The temperature at which cleaning is effected can vary from about 0° C. to about the boiling point of the aqueous treating mixture. However, because of the ease of control of the concentration of cleansing ingredients and the favorable rate of removal of contaminants from the mercury, temperatures of from about 20 to about 40° C. are preferred, and more preferable is a temperature of from about 25–35° C.

The volume ratio of contaminated mercury to aqueous ammonium hydroxide, organic amine or hydroxylamine solution can vary over a wide range, such as from 50 to 1 to about 1 to 50, depending in part on the amount of contaminants in the mercury, on the temperature of treatment and on the concentration of ammonium hydroxide, organic amine or hydroxylamine in the aqueous treating medium. The preferred ratio of contaminated mercury to treating solution ranges from about 1:2 to 1:10, with 1:4 deemed most preferable.

The process can be carried out under reduced, superimposed or atmospheric pressure. The preferred procedure is to operate at atmospheric or autogenous pressure when the mercury contacting step is carried out at 25–35° C. If, however, a higher temperature in the order 45–50° C. or higher is used, a closed system under autogenous pressure has the advantage of minimizing loss of ammonia or organic amine through degassification and evaporation of the aqueous solution.

The amines which can be used include those which are water-soluble to the extent of at least 10%. Amines of this type usually contain from 1 to about 10 carbon atoms. They can be primary, secondary or tertiary amines. Usually, the conversion of some of the amine to a salt of a strong acid or addition of a strong acid salt of the amine to an aqueous medium will increase the solubility of the amine in the amine salt-water solution. Thus, if an amine has a limited solubility of about 10% by weight in water, the addition of an HCl or $H_2SO_4$ salt of the amine to water will raise the amount of amine that will dissolve in the aqueous system to the point where rapid removal of impurities in the contaminated mercury can be effected in a simple treatment of a few minutes if used in the proportions and at the temperatures defined above. This also holds for hydroxylamines.

The generic formula for these nitrogen containing compounds can be written as follows:

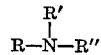

where R and R' represent a lower alkyl group of 1–6 carbon atoms and hydrogen, and R" represents a lower alkyl group of 1–6 carbon atoms, hydrogen and —OH, and in which the total number of carbon atoms in R, R' and R" does not exceed about 10 and wherein the nitrogen containing compound is soluble to the extent of at least 10% by weight in water in the presence or absence of a strong acid salt of any one or a mixture of the said nitrogen containing compounds. The solubility of the nitrogen containing compound in water in the presence or absence of the salt thereof must be such that the final solution is on the alkaline side, preferably at a pH of 7.01–14 and more preferably about 10.

Hydroxylamine is relatively unstable, but readily forms a fairly stable hydrate. The hydrate, in combination with a salt of an amine or mixture of amines defined above, can be used alone or in admixtures with one or more amines or $NH_4OH$ for purifying the mercury. As indicated in the generic formula, the amines can be primary, secondary or tertiary and can be attached to a primary, secondary or tertiary carbon atom.

Repesentative amines include, but are not limited to, methyl amine, dimethyl amine, trimethyl amine, ethyl amine, diethyl amine, triethyl amine, methyl ethyl amine, dimethyl ethyl amine, methyl diethyl amine, propyl amine, isopropyl amine, dipropyl amine, diisopropyl amine, n-butyl amine, isobutyl amine, t-butyl amine, amyl, isoamyl and t-amyl amines, 2-ethyl-butyl amine, and methyl amyl amine, and other amines having a total of about 10 carbon atoms and a solubility in water of 10% or more in the presence or absence of a salt of an amine or an ammonium salt.

The amine salts, including salts of hydroxylamine and ammonium salts, can be salts of HCl, HBr, HF, $H_2SO_4$ or $HNO_3$. The preferred salts are those of HCl and $H_2SO_4$. The use of the salts, however, results in somewhat greater loss of mercury, and for this reason are not preferred.

The agitation of contaminated mercury during the purification step should be sufficiently strong to expose as much of the mercury as possible to the aqueous amine, ammonium hydroxide or hydroxylamine solution. Stated differently, the agitation should be strong enough to disrupt to a large degree the Van der Walls cohesiveness of the mercury to provide efficient intermingling of the phases without substantial emulsification of mercury in the aqueous phase.

The process can be operated as a batch procedure by adding the aqueous ammonium hydroxide, aqueous amine or aqueous hydroxylamine of desired strength in the requisite proportions, adjusting the temperature and stirring the mixture for 5–90 minutes. The mercury is allowed to settle and the aqueous layer is separated from the mercury. The mercury can then be rinsed with water while continuing the agitation. After allowing the mercury to settle, the mercury is separated from the water layer and can be placed in storage or conveyed back to the electrolytic cells.

However, because of the efficiency of the process, it is preferred to operate in a continuous manner.

The examples are intended to illustrate the invention and not to limit it.

Example I

The apparatus comprised a tank made of stainless steel having three internal baffles, and an agitator, operated mechanically, having three sets of blades attached to a shaft which extended through a water-tight grease-packed gland in the top of the unit. The blades on the agitator shaft were spaced so that one set was above and close to each baffle. An opening in the top of the tank was connected to a source of contaminated mercury by means of a pipeline. One pipeline connected slightly above the center of the tank was used for continuously feeding the aqueous nitrogen containing compound and another pipe near the top of the tank was used as an outlet for the spent aqueous purifying solution. A pipeline extended upwardly from the bottom of the tank height to about one half the tank height and then downwardly to enter a rinse tank at about one half the height of the latter. This pipeline served to maintain a constant level for the mercury undergoing purification and as an overflow for treated mercury to a rinse tank. The rinse tank had a construction similar to that of the purification tank. Instead of amine solution, water which served to rinse the treated mercury and to remove some precipitates from the mercury surface was continuously fed into and withdrawn from the second tank. The outlet at the bottom of the tank extended upwardy for about half the height of the tank, so as to maintain a constant level of rinsed mercury. The outlet pipe extended upwardly from the bottom to about half the height of the tank and then downwardly to maintain a constant level of mercury in the rinse tank. The purification tank was elevated slightly above the rinse tank to provide sufficient head for the flow of mercury by gravity from the former to the latter.

Mercury from an electrolytic cell contaminated with about 31 p.p.m. iron and 4 p.p.m. nickel was fed continuously at a rate of about 500–1000 ml. per minute into the purification tank. A 25% by weight ammonium hydroxide solution was fed continuously into the tank at room temperature at a rate of about 2 gallons (7.57 liters) per hour. The mixture was continuously agitated to provide good contact between the mercury and $NH_4OH$ solution. (In this case, the ammonia tank agitator was rotated at about 290 r.p.m.) The mercury was estimated to have a dwell time of about 15–30 minutes in the purification tank. Shortly after the $NH_4OOH$ solution and contaminated mercury contacted each other, the aqueous phase turned a black color, and contained a considerable amount of dense particulate precipitate.

As the mercury continuously overflowed from the purification tank to the rinse tank, it was washed with a continuously flowing stream of water fed into the rinse tank at a rate of 0.1 gal. per minute and at a temperature of about 70–80° C. The water-mercury mixture was agitated at a rotor speed of about 145 r.p.m. The washing step served to remove precipitated materials which had collected at the surface of the mercury.

The cleaned mercury was analyzed and found to contain less than 1 p.p.m. iron and less than 0.4 p.p.m. nickel.

For comparative purposes, a test was run by substituting 25% NaOH for the $NH_4OH$ solution described in the example. Otherwise, conditions were approximately the same as those described above. The aqueous phase in the purification tank was only very slightly darkened and contained only a very small amount of precipitate, thus showing that NaOH was not an effective purifying material, and that purification was not dependent solely on alkalinity of the aqueous phase.

EXAMPLE 2

The mercury of this test contained 81.9 p.p.m. iron and 34 p.p.m. nickel contaminants. The contaminated mercury was fed continuously at a rate of 1000 ml./min. to the purification tank. A solution of 30% by weight of $NH_4OH$ in water was fed continuously to the purification tank at a temperature of 25° C. and a rate of 200 ml./min. The average dwell time of the mercury in the purification tank was calculated at about 20 minutes. In the rinsing step, 0.1 gallon of water per minute at a tempearture of 75 to 80° C. was fed into the tank. The purified and rinsed mercury was found to contain less than 1 p.p.m. iron and less than 0.4 p.p.m. nickel.

In order to determine the solubility characteristics of metallic mercury in $NH_4OH$, 400 ml. of a 30% aqueous ammonia solution was added to 100 ml. of triple distilled chemically pure mercury. The sample was agitated for one hour at room temperature. The aqueous phase was separated and analyzed. It contained 10 p.p.m. mercury. Similar tests with 400 ml. of a 1% $NH_4Cl+1\%$ HCl mixture showed 24 p.p.m. mercury in solution. A 25% acetic acid solution under the same test procedures contained 116 p.p.m. mercury.

Addition of an ammonium salt of a strong acid up to 15% by weight based on the ammonium hydroxide is as effective in removing metal contaminants as NH₄OH alone in the perscribed pH range, but mercury losses are encountered because of the anions present.

The substitution of the water-soluble amines or hydroxylamine, with or without their salts, as mentioned above for the ammonium hydroxide, results in a process that is as effective as that shown by the examples. The use of amines, however, makes the process slightly more expensive because of the higher cost of the amines and hydroxylamine as compared with aqueous NH₃ solutions or NH₄OH— ammonium salt solutions.

If desired, the purification step in which the contaminated mercury is treated with the aqueous solution of the compound having the structure

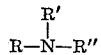

can be operated as a continuous step and the final rinsing step can be operated as a batch process.

Alternately, the purification step can be performed in a batchwise manner and the final rinsing step in a continuous manner.

We claim:

1. A method of purifying mercury which is contaminated with metals and metallic compounds comprising agitating said contaminated mercury with an aqueous solution containing at least about 10% by weight of a compound of the structure

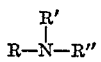

wherein R and R′ each is selected from the class consisting of hydrogen and alkyl groups having from 1 to about 6 carbon atoms, and R″ is selected from the class consisting of hydrogen, —OH, and alkyl groups having from 1 to about 6 carbon atoms, and wherein the total number of carbon atoms in R, R′ and R″ is not greater than about 10, separating the aqueous layer from the mercury layer and thereafter rinsing the mercury with water.

2. The method of claim 1 in which the contacting step with the compound of the structure

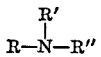

is carried out at a temperature of from about 20 to about 40° C.

3. The method of claim 2 in which the temperature ranges from about 25–35° C.

4. The method of claim 1 in which the mercury is rinsed with water at a temperature of from about 70 to about 80° C.

5. A method of purifying mercury contaminated with metallic ingredients and compounds of said ingredients comprising agitating said mercury in contact with a 20–30% by weight solution of ammonium hydroxide at a temperature of 20–40° C., separating the treated mercury from the aqueous layer, rinsing the separated mercury with water and recovering the purified mercury.

6. A method of purifying mercury contaminated with metallic ingredients and compounds of said ingredients comprising agitating said mercury in contact with a 25–30% by weight aqueous ammonium hydroxide solution, at a temperature of from about 20–40° C. for from about 5 to about 90 minutes, separating the treated mercury from the aqueous spent NH₄OH solution, agitating the separated mercury with water at a temperature of from about 70 to about 80° C. and recovering the rinsed mercury.

7. The method of claim 1 which comprises continuously feeding contaminated mercury and the aqueous solution of the compound of the structure

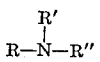

into a mercury purification zone, continuously withdrawing a portion of said aqueous solution from said purification zone, continuously feeding a portion of the mercury from the purification zone to a rinsing unit, continuously feeding water into said rinsing unit and withdrawing therefrom at least a portion of the water so fed, and continuously removing at least a portion of said mercury from the rinsing unit.

8. The method of claim 7 in which ammonium hydroxide at a concentration of 20–30% by weight is fed into the purification zone.

9. The method of claim 7 in which the rinsing step is carried out at a temperature of from about 70 to about 80° C.

10. The method of claim 8 in which the purification step is carried out at a temperature of from about 25 to about 35° C.

11. The method of claim 8 in which the ratio of mercury to ammonium hydroxide solution varies from about 2 to about 10 volumes of NH₄OH per volume of mercury.

References Cited

UNITED STATES PATENTS 2,134,694  11/1938  Bear _____ 75—81

L. DEWAYNE RUTLEDGE, *Primary Examiner.*

T. R. FRYE, *Assistant Examiner.*

U.S. Cl. X.R.

75—97, 121